Oct. 4, 1966 J. H. GUYTON ETAL 3,277,377
COUPLING CIRCUIT FOR ALL-TRANSISTOR HIGH FREQUENCY TRANSMITTER
Filed Oct. 25, 1963
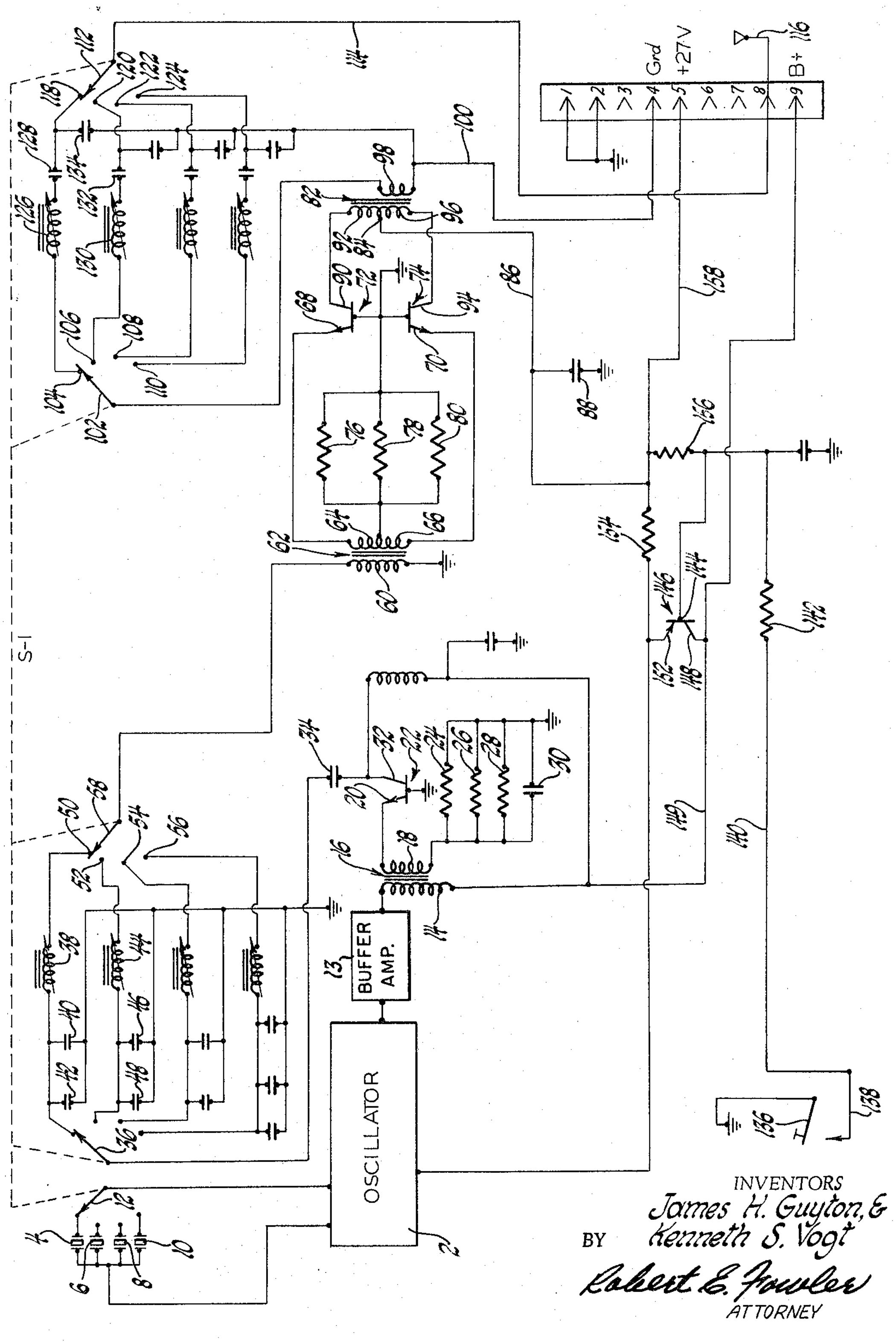
INVENTORS
James H. Guyton, &
Kenneth S. Vogt
BY
Robert E. Fowler
ATTORNEY 3,277,377

COUPLING CIRCUIT FOR ALL-TRANSISTOR HIGH FREQUENCY TRANSMITTER

James H. Guyton and Kenneth S. Vogt, Kokomo, Ind., assignors to General Motors Corporation, Detroit, Mich., a corporation of Delaware Filed Oct. 25, 1963, Ser. No. 318,987
4 Claims. (Cl. 325—172)

This invention relates to high frequency portable transistorized transmitter means for radio communication and more particularly to stable portable multi-channel all-transistor transmitter means capable of being conveniently carried by a person and which has a relatively limited range of operation. Transmitters of this type are primarily designed and utilized by the Armed Forces for communication in field operations but may also be used for any other short range intercommunication.

It is conventional practice in coupling the final power amplifier to the transmitting antenna to utilize a parallel resonant circuit which has high impedance at resonance and low impedance when de-tuned from that frequency. Such a circuit would cause high transistor collector current to flow in the last amplifier stage when de-tuned and if such circuitry were used in portable equipment, damage to the transistors in that stage might be caused by de-tuning when the antenna became grounded or disconnected. This could occur if the set were placed on the ground and fell over causing the antenna to touch ground or become detached and de-tune the output circuit. Improper tuning by untrained personnel is also possible. The final output transistor or transistors might then burn out.

It is an object in making this invention to provide coupling means between the final amplifier and antenna which has a low impedance at resonance and a high impedance when de-tuned which results in a cutting down of collector current if the resonant circuit becomes de-tuned by some accidental change in capacity of the antenna such as grounding, opening, or mis-tuning.

It is a still further object in making this invention to provide a novel transformer coupling means in the final amplifier stage which is used in combination with the coupling means to the antenna for providing the desired impedance match in the output.

With these and other objects in view which will become apparent as the specification proceeds, our invention will be best understood by reference to the following specification and claims and the illustrations in the accompanying drawing, in which:

The figure is a circuit diagram of an all transistor multi-band transmitter embodying our invention.

Referring now more particularly to the circuit diagram, there is disclosed a transmitter capable of operating on four frequencies which are crystal controlled which transmits at a frequency determined by the particular crystal in circuit at that time. The transmitter includes a ganged switching means for changing the frequency control crystals, the coupling between the driver and final output amplifier and the coupling between the output amplifier and antenna simultaneously as different operating frequencies are desired. In the main the transmitter consists of an oscillator for generating the base frequency which is controlled by a plurality of crystals, a driver amplifier stage, and a pushpull output amplifier stage which drives the antenna. A multiposition ganged switch is provided to simultaneously switch the control crystal and the coupling between the amplifier stages of the transmitter.

Referring now specifically to said drawing, there is shown therein an oscillator 2 whose frequency of oscillation is determined by a plurality of crystals 4, 6, 8 and 10, any one of which can be switched into the resonant control circuit for the oscillator by movement of switch arm 12 over a plurality of stationary contacts. As shown, therefore, the transmitter is capable of operating on any one of four frequencies. The output of the oscillator 2 is fed into a buffer amplifier stage 13 whose output is fed in turn into the primary 14 of a coupling transformer 16 for amplification. The secondary 18 of the transformer 16 has one terminal connected to emitter electrode 20 of transistor 22, the base electrode of which is grounded. The opposite terminal of secondary 18 is connected to ground through three resistances 24, 26 and 28 in parallel. Also in shunt to these resistances is a condenser 30.

The collector electrode 32 of the transistor 22 is capacity coupled through condenser 34 to a movable switch arm 36 which is the second arm of the ganged switch means and is adapted to incorporate the proper resonant coupling circuit between the output of the driver amplifying stage including transistor 22 and the input of the push-pull output amplifier stage. Movable switch arm 36 is adapted to move over four stationary contacts. Each line includes an L network such as a series inductance 38 and parallel condensers 40 and 42. Each L network is of a different value and is designed to resonate to the frequency of its associated crystal, that is the L network of the first line consisting of inductance 38 and condensers 40 and 42 would cause this circuit to resonate at the frequency determined by crystal 4, whereas the second line including inductance 44 and condensers 46 and 48 would cause this circuit to be resonant to a frequency determined by crystal 6. The other two L network coupling circuits would be of such value as to resonate at the frequencies determined by crystals 8 and 10.

The output terminals of the L networks terminate in a series of stationary contacts 50, 52, 54 and 56 which are adapted to be engaged by movable switch arm 58 also ganged to the other two movable switch arms and movable simultaneously therewith. Arm 58 is directly connected to one terminal of primary winding 60 of coupling transformer 62, the opposite terminal of which is grounded. Transformer 62 is of trifilar form and includes two other windings wound thereon to give a one-to-one transformer ratio, the other windings being 64 and 66, a common terminal of these latter two windings being connected together and one terminal of each winding being connected to emitter electrodes 68 and 70, respectively, of two transistors 72 and 74. These two transistors form the push-pull output amplifying stage of the transmitter. A plurality of resistances 76, 78 and 80 are connected in parallel between the common tap of windings 64 and 66 and the base electrodes of the two transistors 72 and 74 and ground. This input transformer 62 thus applies the generated and amplified transmitter signal to the push-pull output stage.

The output transformer 82 for the push-pull stage is also wound in a trifilar manner with the common end of two windings secured together at point 84 which point is connected through line 86 to the power input line 158. Filter condenser 88 is connected between this line and ground. The collector electrode 90 of transistor 72 is connected to the remaining terminal of one of the windings 92 and the collector electrode 94 of transistor 74 is in like manner connected to the remaining terminal of a second winding 96. The third and output winding 98 of the transformer 82 has its lower terminal connected to ground through line 100 and its upper terminal connected to the movable switch arm 102 for connecting in alternate series resonant circuits as the different transmission frequencies are utilized. Switch arm 102 is adapted to be moved over stationary contacts 104, 106, 108 and 110. The final movable switch arm 112 of the ganged switch is connected directly through line 114 with the antenna 116 of the transmitter. This switch arm is adapted to be moved into engagement with four stationary contacts 118, 120, 122 and 124. Connected between stationary contact 104 and stationary contact 118 there is a series resonant coupling circuit consisting of an adjustable inductance 126 and a condenser 128. These two components are selected so that the inductance may be tuned to provide a resonant frequency of this series circuit at one desired frequency of transmission. In this case the circuit would be adjustable to the resonant frequency determined by the crystal 4. In like manner an adjustable inductance 130 and a condenser 132 are connected in series between stationary contacts 106 and 120 and these would be of proper value so that they could be tuned to the resonant frequency determined by the crystal 6. A condenser 134 is connected between the first series resonant line and the ground line 100 for filtering. A similar condenser is connected to each of the other series resonant lines and ground.

Means for keying the transmitted frequency in order to transmit CW code is provided through the use of a movable key 136 which is grounded and adapted to engage a stationary contact 138 to complete the oscillator circuit and cause it to become operative. This latter contact is connected through line 140 and resistor 142 with the base 144 of a switching transistor 146 which controls the coupling transformer 16. To accomplish this the collector electrode 148 of transistor 146 is connected to a voltage supply line 149 which extends to the lower terminal of transformer winding 14, the other terminal of which is connected to the oscillator. The emitter electrode 152 of transistor 146 is connected to a second power line through a limiting resistor 154. A biasing resistor 156 for the base electrode which forms part of a voltage divider is connected between power line 158 and the base of transistor 146.

In the normal operation, therefore, the operator would determine operating frequency, then move the switch S1 with its multi-pole arms to place in the circuit the crystal determining that frequency which simultaneously includes the coupling circuits with proper resonance characteristics for the same. The oscillator would, therefore, generate the desired frequency and the resonant coupling circuits would convey the amplified signals between the stages and to the antenna. In the series coupling circuits between the movable switch arms 102 and 112 series resonant circuits are provided, for example, by adjustable inductance 126 and capacitor 128. By the use of this circuit the impedance is low at resonance from the amplifier stage to the load or antenna. When it is de-tuned for any reason, such as by the antenna encountering an object to change its capacity, the impedance increases resulting in a lower collector current. This, therefore, protects the two push-pull output transistors 72 and 74. If the transmitter happens to be placed on the ground and falls over so that the antenna strikes an object or the ground itself, it might, therefore, become de-tuned but the current will be reduced through the transistors and, therefore, they will not be injured by burning out through such de-tuning. With the set in operation for a given frequency it can be keyed to apply code by operating key 136 which controls switching transistor 146 to turn the oscillator on and off in coded pulses.

As before mentioned, transformers 62 and 82 are trifilar wound. This is in order to provide maximum energy transfer by transformers having unit ratio. They are also wound on toroidal ferrite cores. The collector supply voltage from power line 158 is fed into the junction of the two windings at point 84 and the emitter resistors providing proper bias for the emitters are connected into a similar connection of windings 64, 66 of transformer 62. When the polarity is such that transistor 72, for example, is drawing maximum current the voltage drop across the emitter resistor reaches a peak. This causes the other transistor 74 to be further cut off and provides class "C" operation.

With this circuitry, therefore, there is provided a maximum power transfer to the output circuit and a protection against burn out of the transistors in the final output amplifier.

What is claimed is:

1. In radio transmitter means, a source of electrical power, an oscillator connected to said source of electrical power for producing oscillatory waves of different frequencies, a plurality of control means alternatively connectible to said oscillator to tune the source to a plurality of different frequencies, amplifying means connected to said oscillator to amplify the output thereof, a plurality of series resonant tuned circuits alternatively connectible with said amplifying means each of which is adjusted to the frequency of one of the control means connectible to the oscillator, an antenna and multi-pole ganged switching means connected between the plurality of control means and the oscillator, between the amplifying means and the series tuned resonant circuits and between the series tuned resonant circuits and the antenna to independently switch each control means to the oscillator and simultaneously switching in a series tuned resonant circuit tuned to the same frequency as the control means between the amplifying means and the antenna to apply a signal to the antenna for radiation.

2. In radio transmitter means having a source of electrical power, oscillatory means for generating waves of a desired frequency connected to said source of electrical power, and amplifying means connected to the oscillatory means to amplify the generated waves the improvement which includes a transformer having a trifilar winding, one winding of which acts as a primary and is connected to the output of the amplifying means, the other two windings being connected in series having a common terminal, resistance means connected from the common terminal to ground, a plurality of transistors connected in push-pull relation having an input and an output circuit, said input circuit being connected to the remaining terminals of the other two windings, a second trifilar wound transformer, two of said windings being connected in series and forming a primary winding with the outer terminals connected to the output circuit of the transistors connected in push-pull relation and the center common terminal to the source of electrical power, and antenna means connected to said last winding on the second trifilar transformer to radiate the signal applied thereto, said push-pull amplifying circuit being aided in cut off on the non-conducting side by the bias and trifilar coupling.

3. In radio transmitter means having a source of electrical power, oscillating means for generating waves of a desired frequency connected to said source of electrical power, and amplifying means connected to the oscillatory means to amplify the generated waves the improvement which includes a second amplifying means including a push-pull transistorized stage having an input and an output circuit, a trifilar transformer means connected to its input circuit, a second trifilar transformer connected to its output circuit for more positive bias on-off operation, means for connecting the output of the first-named amplifying means to the first trifilar transformer means, antenna means for radiating the applied signal, said antenna means being connected to the second trifilar transformer.

4. In radio transmitter means having a source of electrical power, oscillatory means for generating waves of a desired frequency connected to said source of electrical power, and amplifying means connected to the oscillatory means to amplify the generated waves the improvement which includes a second amplifying means including a push-pull transistorized stage having an input and an output circuit, a trifilar transformer connected to its input and a second trifilar transformer connected to its output circuit for more positive bias on-off operation, means for connecting the output of the first-named amplifying means to the first trifilar transformer means, antenna means for radiating the applied signal, and series resonant tuned circuit means connected to the second trifilar transformer means and to the antenna means to provide a coupling means which will increase in impedance when de-tuned by any condition.

References Cited by the Examiner

UNITED STATES PATENTS

| | | | |
|---|---|---|---|
| 2,376,667 | 5/1945 | Cunningham et al. | 325—174 |
| 2,440,081 | 4/1948 | Fick | 325—172 |
| 2,498,078 | 2/1950 | Harrison | 325—171 |
| 2,568,412 | 9/1951 | Robinson | 325—177 |

DAVID G. REDINBAUGH, *Primary Examiner.*

JOHN W. CALDWELL, *Examiner.*